(12) United States Patent
Plana

(10) Patent No.: US 7,032,916 B2
(45) Date of Patent: Apr. 25, 2006

(54) STABILIZER TRAINING WHEEL WITH INTEGRAL SUSPENSION

(75) Inventor: Salvio Plana, Drummondville (CA)

(73) Assignee: Brevets Futek-MSM LTEE, Quebec (CA)

( * ) Notice: Subject to any disclaimer, the term of this patent is extended or adjusted under 35 U.S.C. 154(b) by 68 days.

(21) Appl. No.: 10/740,687

(22) Filed: Dec. 22, 2003

(65) Prior Publication Data

US 2005/0134019 A1    Jun. 23, 2005

(51) Int. Cl.
B62H 1/12    (2006.01)
(52) U.S. Cl. .................... 280/293; 280/288.4; 280/296
(58) Field of Classification Search ............. 280/288.4, 280/293, 296, 298–301
See application file for complete search history.

(56) References Cited

U.S. PATENT DOCUMENTS

| | | | |
|---|---|---|---|
| 2,450,979 | A | 10/1948 | Moller |
| 2,778,159 | A | 1/1957 | Irwin |
| 2,793,877 | A | 5/1957 | Meier, Jr. |
| D205,065 | S | 6/1966 | Bollinger et al. |
| 3,610,652 | A | 10/1971 | Moore |
| 3,704,740 | A | 12/1972 | Moore |
| 3,740,100 | A | 6/1973 | Perego |
| 4,006,765 | A | 2/1977 | Albright |
| 4,124,051 | A | 11/1978 | Horton |
| 4,444,435 | A | 4/1984 | Honsa |
| 4,511,184 | A | 4/1985 | Schauf et al. |
| 4,530,543 | A | 7/1985 | Keane |
| 4,588,542 | A | 5/1986 | Pierce |
| 4,589,702 | A | 5/1986 | Bach et al. |
| 5,104,198 | A | 4/1992 | Prout et al. |
| 5,133,569 | A | 7/1992 | Rieber et al. |
| 5,188,430 | A | 2/1993 | Chiu |
| 5,222,786 | A | 6/1993 | Sovis et al. |
| 5,224,961 | A | 7/1993 | Liu |
| 5,246,275 | A | 9/1993 | Arredondo, Jr. |
| 5,314,241 | A | 5/1994 | Cheng |
| 5,368,371 | A | 11/1994 | Markling |

(Continued)

FOREIGN PATENT DOCUMENTS

CA    2 058 334    6/1992

(Continued)

OTHER PUBLICATIONS

Sridhar Kota, et al., "Tailoring Unconventional Actuators Using Complaint Transmissions: Design Methods and Applications", IEEE/ASME Transactions on Mechatronics, vol. 4, No. 4, pp. 396-397 (Dec. 1999).

*Primary Examiner*—Lesley D. Morris
*Assistant Examiner*—L. Lum
(74) *Attorney, Agent, or Firm*—Jacobson Holman PLLC

(57) ABSTRACT

A single-piece side wheel attachment member for removably attaching an auxiliary side wheel to a bicycle is provided. The attachment member has a single-piece molded structure, including an upper vertical portion and a lower substantially horizontal spindle portion connected through a C-shaped compliant structure for allowing the spindle portion to move vertically when subjected to force. In its natural unbiased condition, the vertical and horizontal portions of the member extend generally perpendicular to one another. The upper vertical portion includes a projection and at least one through-hole for insertion on the rear wheel axle of the bicycle. The horizontal spindle portion is rotatably engaged by the auxiliary side wheel, therefore acting as its axle. Both ends of the attachment member can angularly move relative to one another due to the C-shaped compliant structure.

17 Claims, 12 Drawing Sheets

U.S. PATENT DOCUMENTS

| | | |
|---|---|---|
| 5,466,051 A | 11/1995 | Liao |
| 5,492,354 A | 2/1996 | Rainey |
| 5,603,555 A | 2/1997 | Dickey et al. |
| 5,707,069 A | 1/1998 | Plana |
| 5,782,540 A | 7/1998 | Camfield et al. |
| 5,791,742 A | 8/1998 | Kiser |
| 5,853,226 A | 12/1998 | Lee |
| 5,884,982 A | 3/1999 | Yemini |
| 6,113,122 A | 9/2000 | Plana |
| 6,196,638 B1 | 3/2001 | Mizuno et al. |
| 6,209,697 B1 | 4/2001 | Austin |
| 6,467,519 B1 | 10/2002 | Owen |
| 2001/0001222 A1 | 5/2001 | Markling |
| 2003/0001429 A1 | 1/2003 | Gubesch et al. |
| 2004/0057249 A1 | 3/2004 | Arlon |
| 2005/0052054 A1 | 3/2005 | Hess et al. |

FOREIGN PATENT DOCUMENTS

| | | |
|---|---|---|
| EP | 0 127 425 A1 | 5/1984 |

STABILIZER TRAINING WHEEL WITH INTEGRAL SUSPENSION

FIELD OF THE INVENTION

The present invention relates to attachments for a bicycle, and more particularly to a training wheel assembly or an auxiliary wheel assembly that controls dynamic lateral instability when using the bicycle.

BACKGROUND OF THE INVENTION

The use of a pair of auxiliary side wheels that are to be removably attached on or over the rear axle of a bicycle to control its dynamic lateral instability is well known in the art. The ground stability of bicycles is dynamically enhanced by increased vehicle speed. However, the lateral stability of the bicycle is difficult to maintain at low vehicle speeds, particularly for children and other persons inexperienced in the art of bicycle riding. These side wheels are most often used with children who are learning the basics of riding a bicycle and who still cannot develop sufficient lateral stability when riding their bicycle for the first few times.

Several auxiliary side wheels that exist have the problem of comprising rigid attachment means for linking them to a conventional bicycle. Such rigid attachment means prove to be disadvantageous in several situations. For example, the unevenness of the ground will often result in one of the side wheels being raised above the ground level of the rest of the bicycle wheels, including the opposite side wheel, and therefore not stabilizing the bicycle as it is supposed to. In other cases, the rear bicycle wheel could be elevated with respect to ground level, the rider then losing propulsion capability temporarily. Furthermore, when the rider enters a turn, the lateral stability of the bicycle will again be compromised, as the bicycle will not be able to incline itself properly because of the side wheel's rigid attachment.

The above-described problem has been resolved through a few patents that include suspension means between the bicycle and the auxiliary wheels.

U.S. Pat. No. 5,492,354 issued to RAINEY in 1996 shows training wheels mounted at the end of a coil spring fitted on each side of the rear bicycle wheel axle. The axes of the coil springs are in line with respect to each other and are located with an offset below and parallel to the rear wheel axle. Thus the training wheels can be pulled backward against the action of the spring even though the coil spring allows their upward movement. Consequently, a drawback of the apparatus disclosed by RAINEY is that friction resulting from uneven terrain may cause one of the two auxiliary wheels to be pulled backwards, and thus resist forward movement making the bicycle turn inadvertently.

U.S. Pat. No. 2,450,979 issued to MOLLER in 1948 discloses another coil spring suspension system for mounting to an auxiliary wheel assembly on a bicycle rear wheel axle. A L-shaped bracket interconnecting both axles keeps the auxiliary wheel axle downwardly offset from the bicycle gearwheel axle. An upwardly inclined, adjustable length coil spring member movably interconnects the hub of the auxiliary wheel to the bicycle rear wheel axle. The MOLLER apparatus would be expensive to manufacture and susceptible to damage because of its numerous separate components.

U.S. Pat. No. 2,793,877 issued to MEIER in 1957 shows an apparatus which uses a generally L-shaped flat spring blade to mount an auxiliary wheel to a location near the rear bicycle rear wheel. The vertical leg of the L-spring blade and that of a second, rigid L-blade are anchored to the bicycle rear wheel axle. An adjustable length vertical member movably connects the transverse leg of the rigid blade overlying the transverse wheel axle leg of the flexible blade to the latter flexible blade. The relative angular play between the auxiliary wheel axle and the bicycle rear wheel axle is quite limited with this apparatus, since the auxiliary wheel axle motion is limited to a downward motion relative to the horizontal leg of the rigid L-blade which remains parallel to the bicycle rear wheel axle. In order to prevent travel of the blade spring in a horizontal plane either forward or backward, a second rigid blade and legs are required when using the blade spring.

In all of the above noted patents, the auxiliary wheels are functional, but they are complicated at different levels in that they either require a plurality of parts for installing the side wheels on the bicycle (e.g. brackets, spindles, springs, etc.) or additional manufacturing requirements when a single structural part is used which increase the cost of manufacturing the product.

SUMMARY OF THE INVENTION

It is an object of this invention to provide an auxiliary wheel assembly for a bicycle which will stabilize the bicycle in a generally vertical position, particularly at low speed.

It is another object of this invention that the auxiliary wheel assembly comprising a single C-shape compliant structure attachment means to allow an almost constant contact of each of the two auxiliary wheels to the ground. It is an important object of this invention to provide attachment means for removably attaching side wheels on the bicycle, that are simple and can be easily installed on—and removed from—the bicycle.

It is yet another object that the attachment means for removably attaching the side wheels to the bicycle consist of a single structural part.

An important feature of the invention is to provide an auxiliary wheel assembly for a bicycle, which will include a C-shape compliant structure means enabling upward angular adjustment of the auxiliary wheels relative to the bicycle main rear wheel.

Another important feature of the invention is to increase the safety in the use of bicycles fitted with such auxiliary side wheels.

Another feature of the invention is its simplicity of installation.

In accordance with the objects of the invention, there is provided a single-piece attachment member to be fitted to a rear wheel axle and a tine holding said rear wheel of said bicycle for providing lateral dynamic stability of said bicycle, a pair of such single-piece attachment members adapted to be used concurrently on opposite respective lateral sides of said rear wheel axle. Each single-piece attachment member has an upper vertical portion including at least one through-hole for insertion on said rear wheel axle, and a lower substantially horizontal spindle portion connected to said vertical portion through a C-shaped compliant structure for allowing said spindle portion to move vertically when subjected to force. The spindle portion is substantially parallel to said rear wheel axle, with said C-shaped compliant structure having a central axis parallel to the direction of motion of the bicycle and an opening located between said vertical portion and said spindle portion, by said portions acting as substantially perpendicular segments and said C-shape compliant structure acting as a vertex.

Preferably, the attachment member is made of a single piece of molded, shaped or formed material. The spindle portion may naturally extend downwardly from the horizontal (i.e. more than a 90° angle is made between the vertical portion and the spindle portion), in such a way that, as weight is applied to the auxiliary wheel, the C-shape compliant structure flexes and the spindle portion moves upwardly towards the horizontal.

Height adjustment means may also be provided which co-operate with the rear wheel axle anchoring means, for varying the vertical distance between the rear wheel axle and the spindle portion, to fit bicycles of varying wheel sizes. The anchoring means may include a nut member threaded onto an axle bolt on the rear wheel axle for fixedly releasably sandwiching the vertical portion of the attachment member against the tine holding the rear wheel axle. The anchoring wheel axle nut may also comprise a quick release mechanism. The tip of the spindle portion may be shaped into a locking means for locking the auxiliary wheel in position along the spindle portion.

BRIEF DESCRIPTION OF THE DRAWINGS

The invention will be better understood by way of the following detailed description of a preferred embodiment with reference to the annexed drawings in which.

DETAILED DESCRIPTION OF THE EMBODIMENTS

Figure 2:
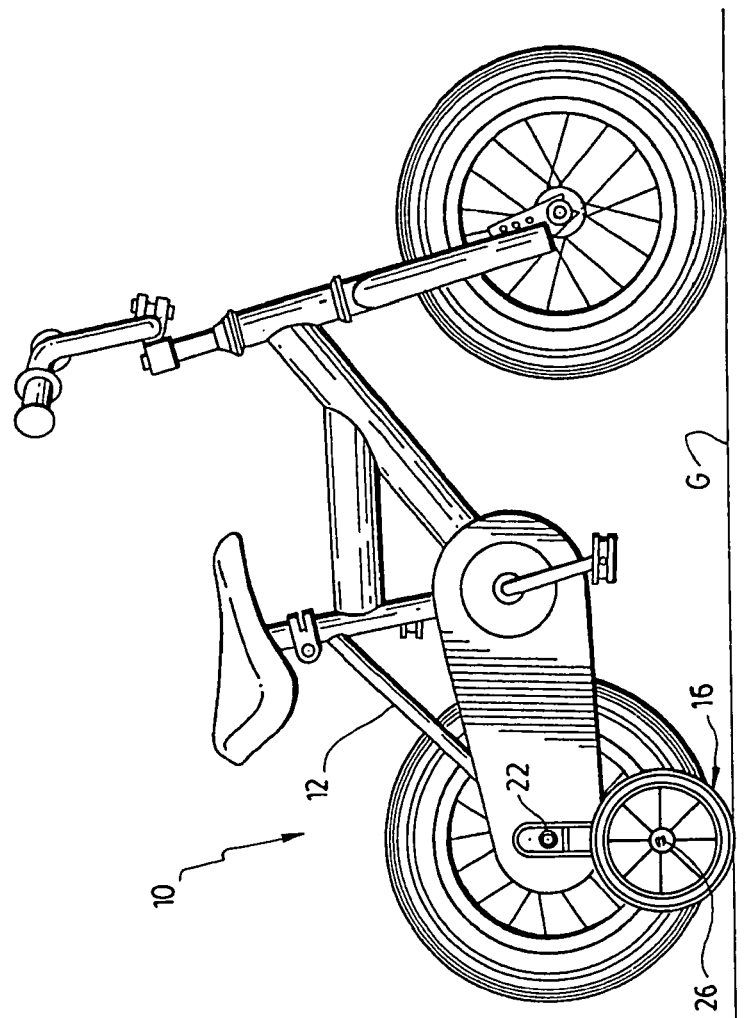
FIG. 2 is a side view of a bicycle, with the auxiliary wheel assembly of FIG. 1.
Figure 1:
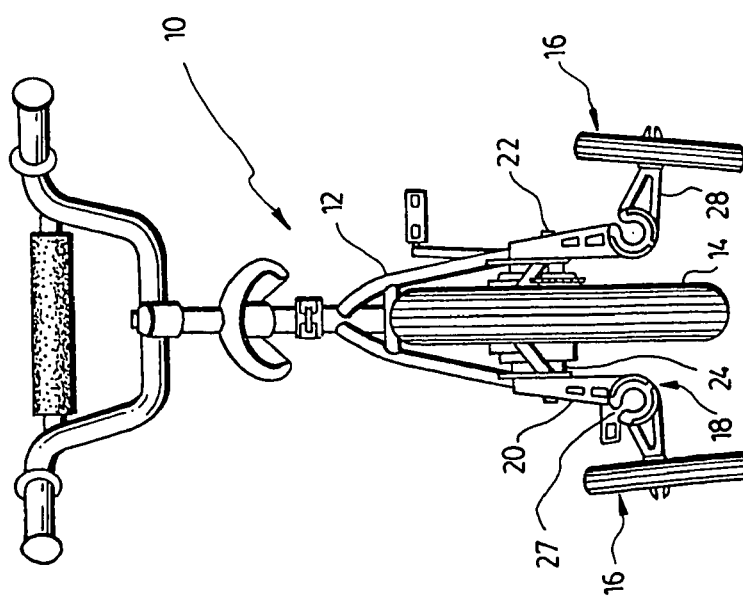
FIG. 1 is an end view of a bicycle equipped with a pair of auxiliary wheels and wheel attachment means according to this invention.

FIGS. 1 and 2 show a conventional bicycle 10 comprising of a rigid frame 12 carrying a rear wheel 14 over ground G by an axle 24.

Bicycle 10 is equipped with a pair of auxiliary side wheels 16, which are smaller in diameter than rear wheel 14. Wheels 16 are to be positioned on each side of rear wheel 14. Wheels 16 are to be rotatably mounted on their corresponding auxiliary side wheel attachment members 18 which are fixedly and removably anchored to opposite ends of axle 24 of bicycle 10. The attachment members 18 comprising of a C-shape compliant structure 27 therefore link the auxiliary side wheels 16 to bicycle frame 12.

Figure 4:
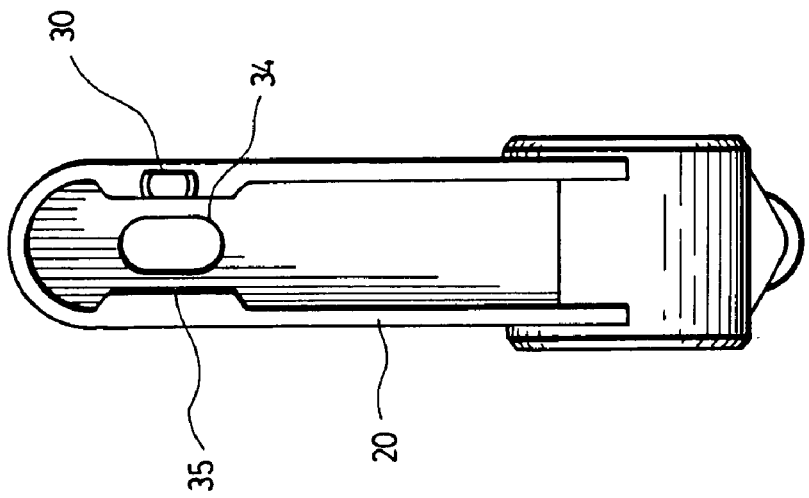
FIGS. 3 and 4 are front and side views respectively, of the attachment member of the invention comprising a C-shape compliant structure.
Figure 3:
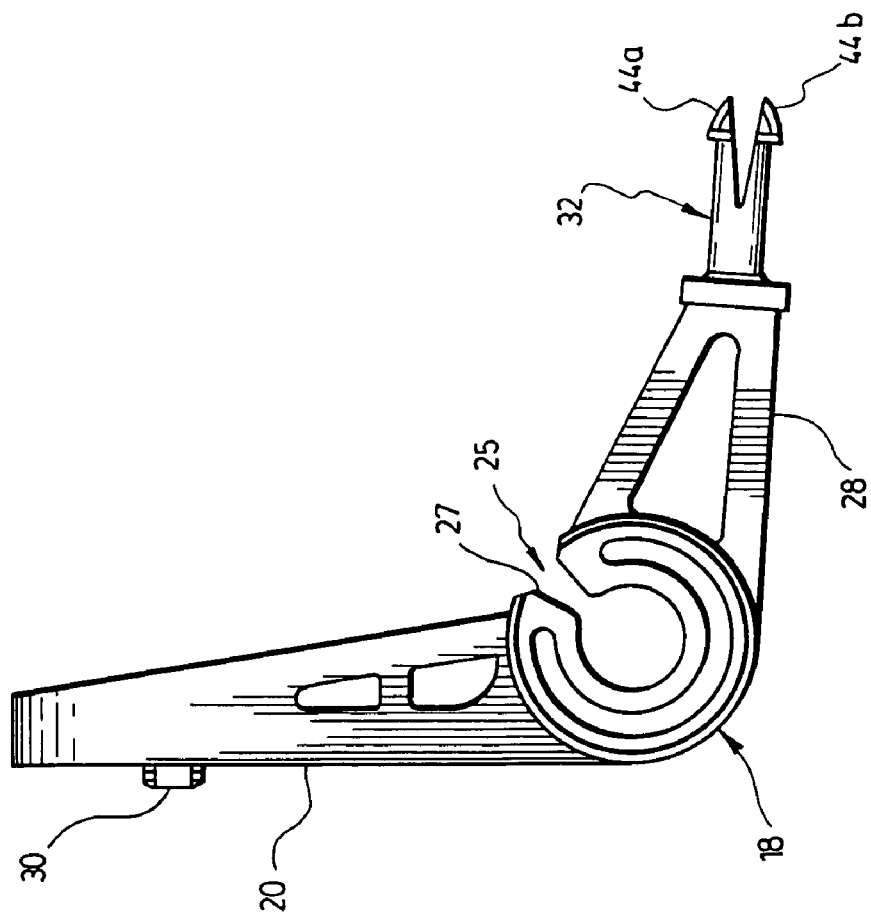

FIGS. 3 and 4 show that the attachment member 18 has an upper vertical portion 20, an intermediate C-shaped compliant structure 27 and a lower horizontal auxiliary wheel spindle end portion 28. As shown in FIG. 4, all elements 18, 20 and 28 are coplanar to each other in an end view, but form in their natural unbiased condition a L-shape in plan view as seen in FIG. 3. Consequently, C-shaped compliant structure 27 enables portions 20 and 28 to move toward or away from each other. FIG. 3 shows the attachment member 18 in the unloaded or unbiased condition of the C-shaped compliant structure 27, where portions 20 and 28 make approximately a right angle relative to each other. In the unloaded condition of FIG. 3, the C-shaped compliant structure 27 will yield upon an application of force and enable movement of portions 20 and 28 toward one another, yet will bring portions 20 and 28 to their original unbiased approximate right angle condition shown in FIG. 3 as soon as the application of force on portions 20 and/or 28 is removed. C-shaped compliant structure 27 has a central axis parallel to the direction of motion of the bicycle and an opening 25 located between the vertical portion 20 and the spindle portion 28, said portions acting as substantially perpendicular segments and said C-shaped compliant structure 27 acting as vertex. As shown in FIG. 3, the opening generally opens in an upward direction, facing the side of the two portions that defines the generally right angle relationship between them.

Furthermore, the C-shape structure 27 can be made more or less stiff by removing material in the C-shape structure 27, as will be apparent to a person skilled in the art. Thus, the attachment member 18 can be adapted to the weight of the person using the attachment member 18. A stiffer structure 27 will be used for a heavier person, while a less-stiff structure 27 will be used for a lighter person.

The attachment member 18 of the present invention is also adapted to prevent torsion of the member 18 to a great degree, which increases security. Thus, should wheel 16 impact an object such as a rock while the bicycle is moving forward, the member 18 will resist backward movement.

Side wheel attachment member 18 is made from a single piece of material molded, formed or shaped to the desired shape. Indeed, the vertical portion 20 and auxiliary wheel horizontal spindle portion 28 integrally form two extremities for the C-shape compliant structure 27. Therefore, side wheel attachment members 18 can be easily manufactured and installed as a result of their structural simplicity.

Figure 5:
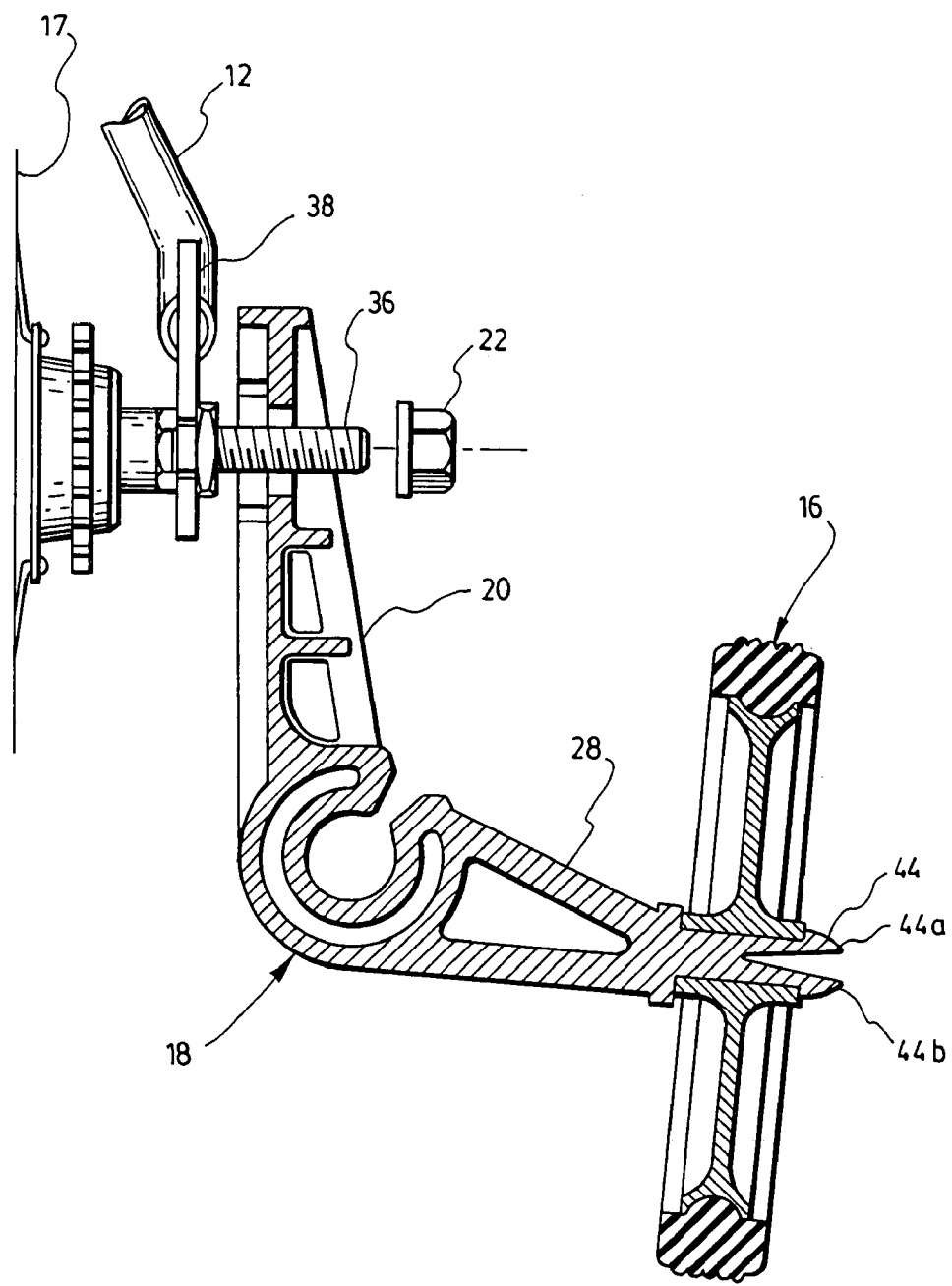
FIG. 5 is a sectional view of the auxiliary wheel assembly when installed on the rear-wheel axle of the bicycle.
Figure 6:
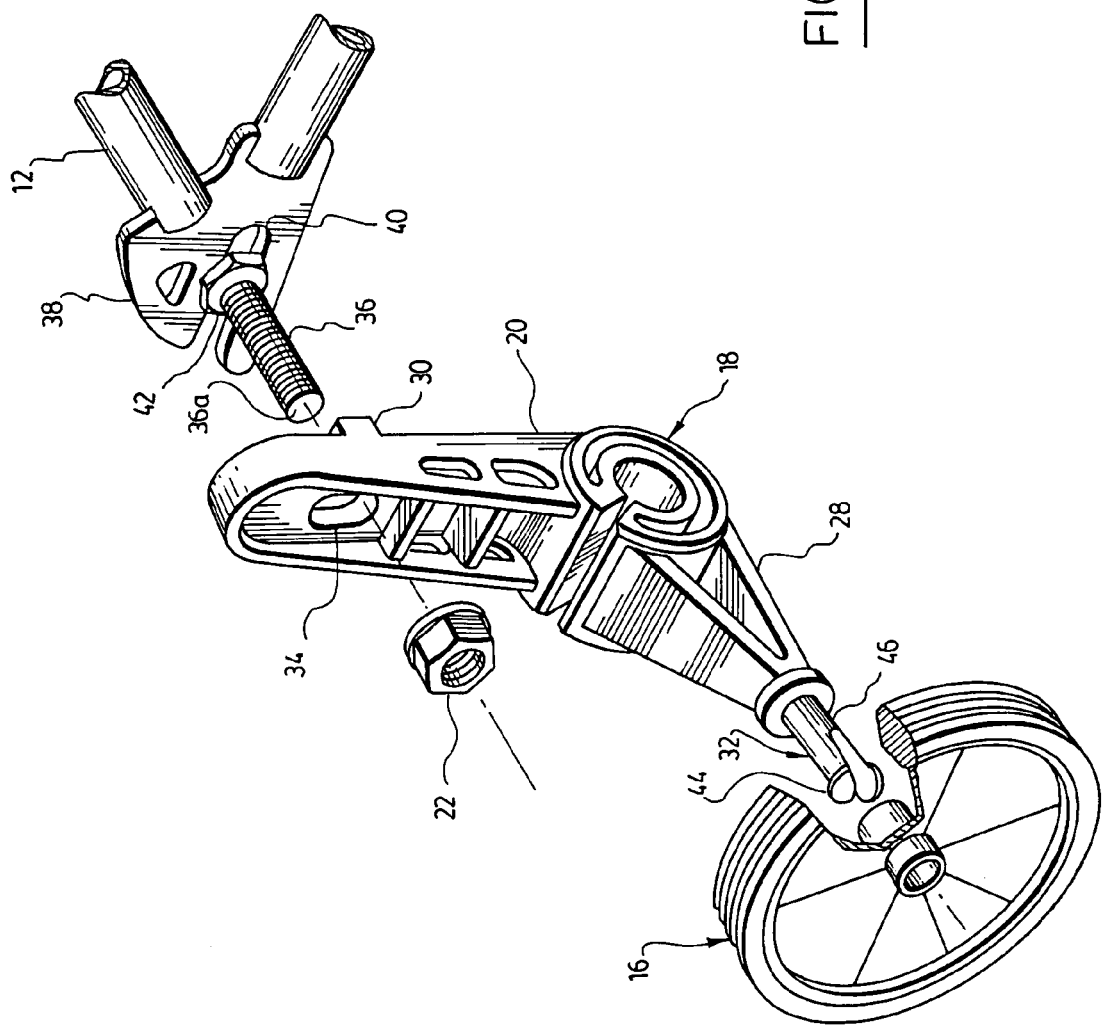
FIG. 6 is an exploded view demonstrates how the attachment member can be installed on the rear-wheel axle and secured to the axle with a nut member and showing how the projection of the vertical portion of the attachment member can be inserted in a slot of the tine holding the axle.
Figure 7:
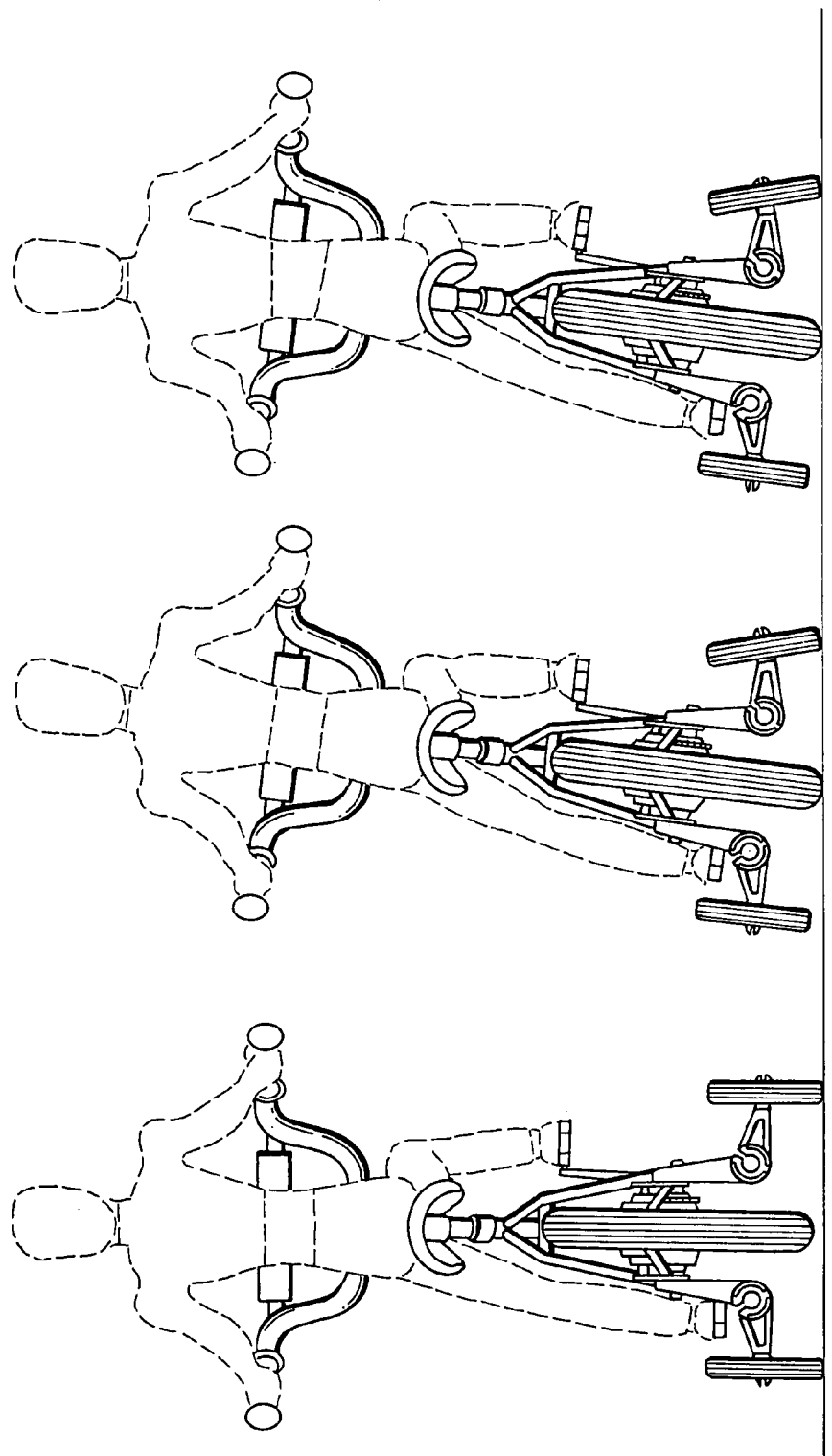
FIG. 7 suggests how the present bicycle suspension provides enhanced bicycle stability.

During installation, vertical portion 20 of attachment member 18 is brought sideways of bicycle wheel 14, generally parallel thereto, so that the threaded free end portion 36a of the bicycle rear wheel axle 36 engages through one through-hole 34 manufactured in the vertical portion 20, and laterally exteriorly beyond the plane of the vertical portion 20 (see FIGS. 5 and 6). In order to accommodate different rear wheel 14 diameters, vertical portion 20 may include additional through-holes placed along the length of vertical portion 20 or through-holes of different sizes which will be used to adjust the level of the vertical distance between the rear wheel axle and the horizontal spindle portion 28, which behaves as an axle for the auxiliary wheel. A nut 22 is then screwed on axle end 36*a* to fixedly anchor vertical portion 20 transversely to axle 36. A projection 30 in vertical portion 20 fits in a slot 40 of tine 38 attached to bicycle frame 12 and provides additional resistance to external loading for the attachment member 18. FIG. 4 illustrates that a narrowing of the vertical portion structure 35 around the through-hole 34 can be used to match and rest against the contour of nut 42 located against tine 38 shown in FIG. 6 once the attachment member 18 is installed. This also provides additional resistance to external loading for attachment member 18. The simplicity of the design of the attachment member 18 significantly facilitates and accelerates the above installation process compared to other types of auxiliary wheel assemblies.

Alternatively, as shown in FIGS. 12 to 15, the means for anchoring the attachment member can include a bracket 101 (known in the art) which has a projection 103 extending through at least one slot 105 formed on at least one, but preferably both sides of through-hole 34.

Figure 14A:
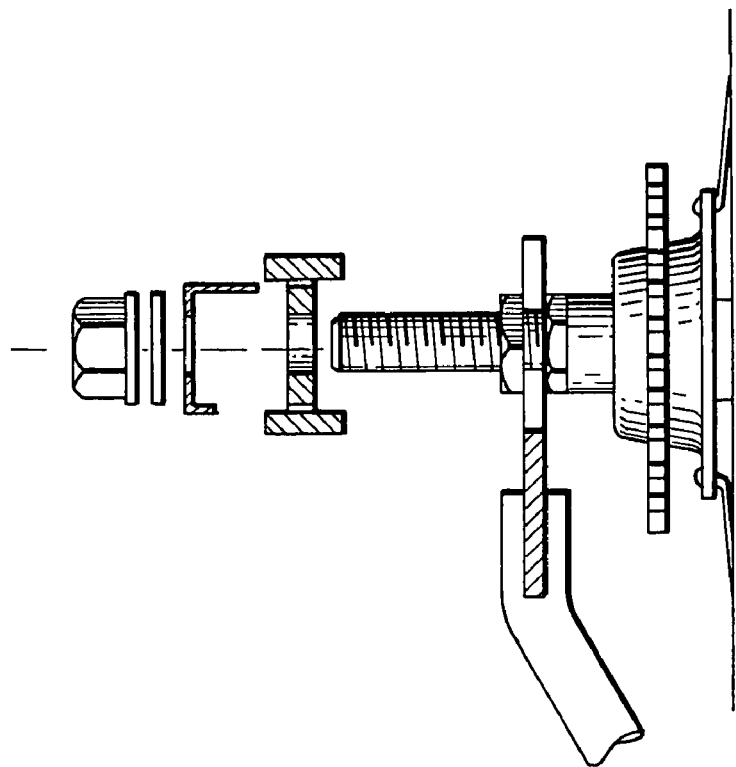
FIGS. 14(a) and 14(b) show that the clip can be inserted inside or outside of the attachment member.
Figure 14B:
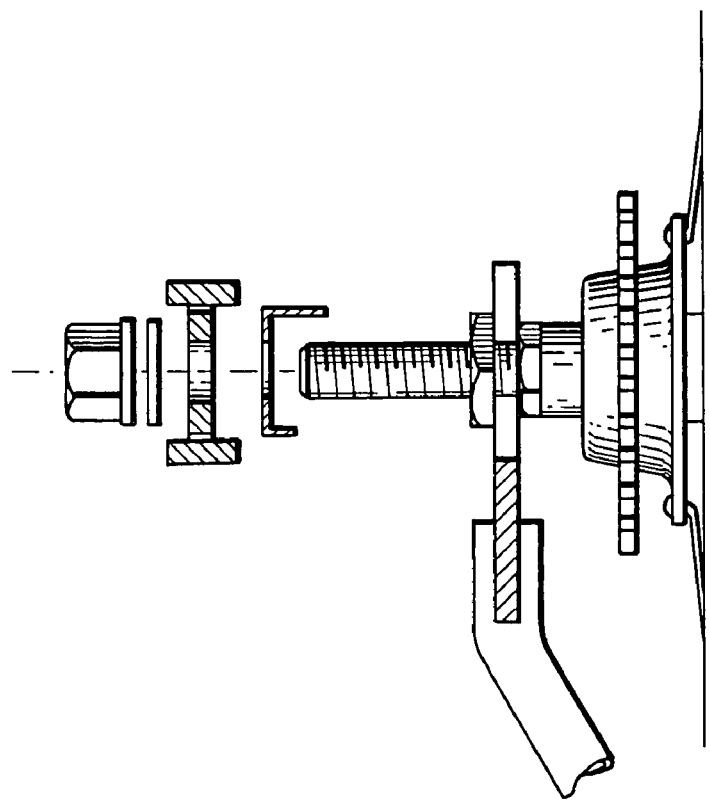
Figure 15:
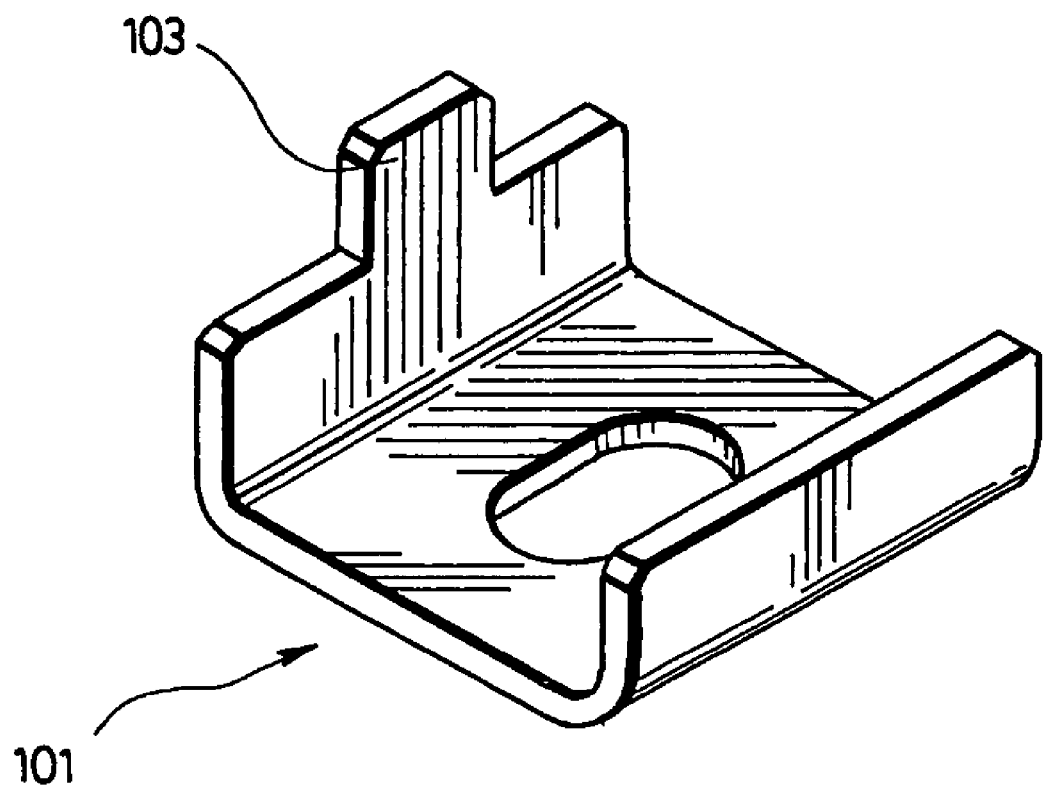
FIG. 15 is a perspective view of a clip according to a preferred embodiment of a clip known in the art.

Furthermore, bracket 101 can be installed outside (see FIG. 14(*b*)) or inside (see FIG. 14(*a*)), as is known in the art. Finally, a prior art bracket 101 having three holes and three projections is known, which can be used with the present invention attachment member 18.

Each side wheel 16 is rotatably freely mounted on its corresponding spindle portion 28, near its outer end 32, for a proper lever length. As suggested in FIG. 5, side wheel 16 can be fitted on the outer end 32, by passing over a compliant structure 44 including tips 44*a* and 44*b* which can be compressed one towards another sufficiently to allow passage of the wheel 16 as it is inserted on outer end 32 and which return to a natural unbiased position to retain wheel 16 in place along the length of the spindle portion 28 once wheel 16 is in place on auxiliary wheel axle 46.

Figures 8, 9:
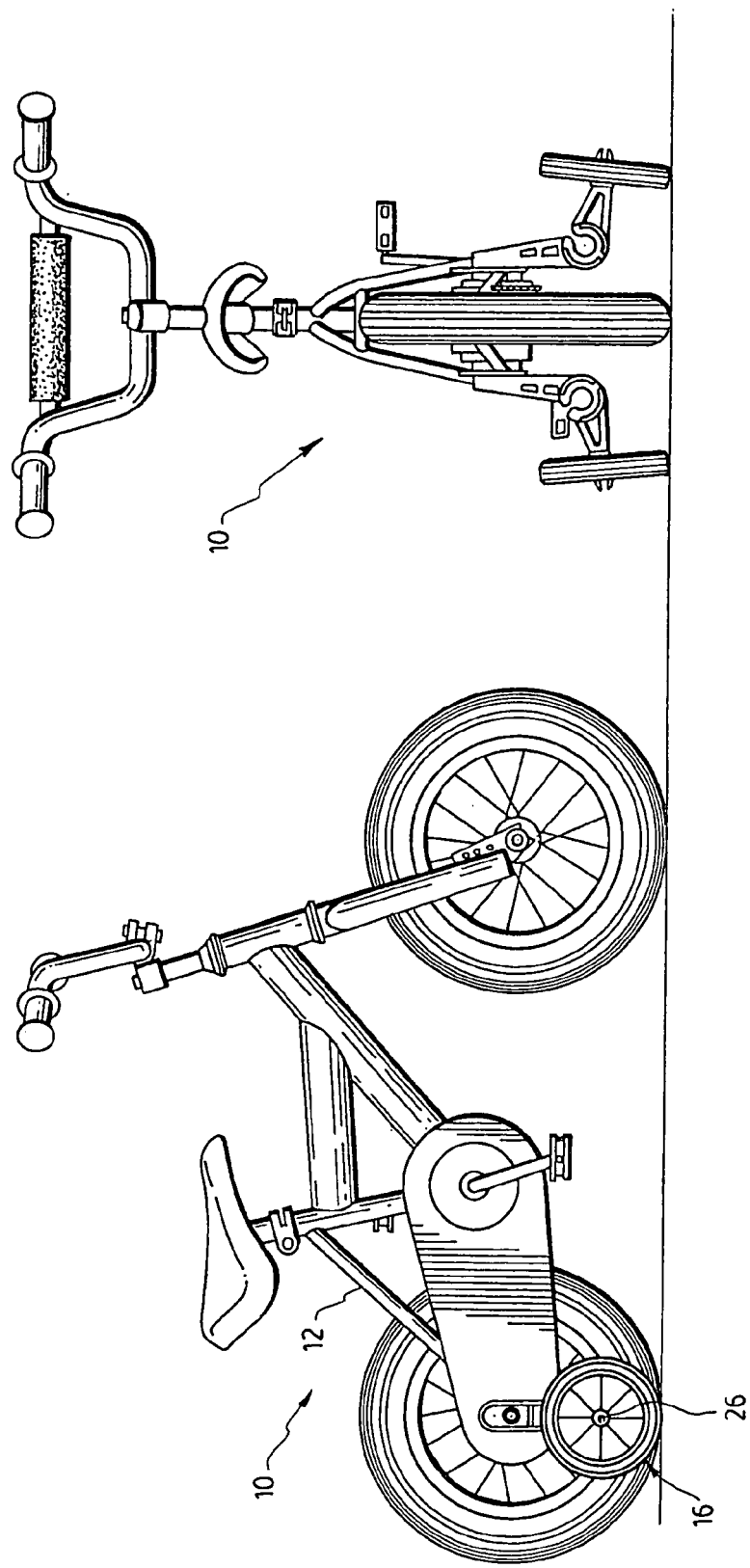
FIG. 8 is a side view of the bicycle with the auxiliary wheel assembly of FIG. 1 where the auxiliary wheel assembly is flush with the bottom of the rear wheel.
FIG. 9 is an end view of a bicycle equipment with a pair of auxiliary wheels.
Figure 10:
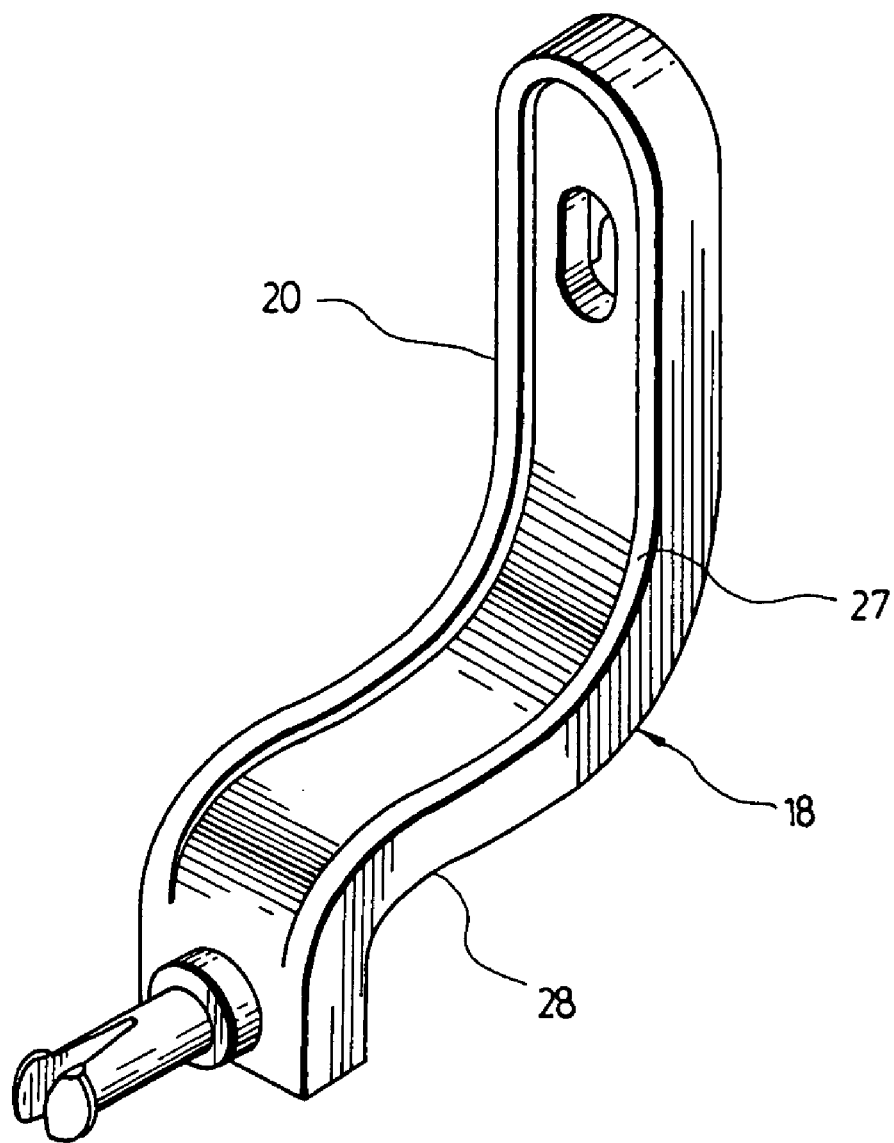
FIG. 10 is a perspective view of an attachment member according to another embodiment of the invention.
Figure 11:
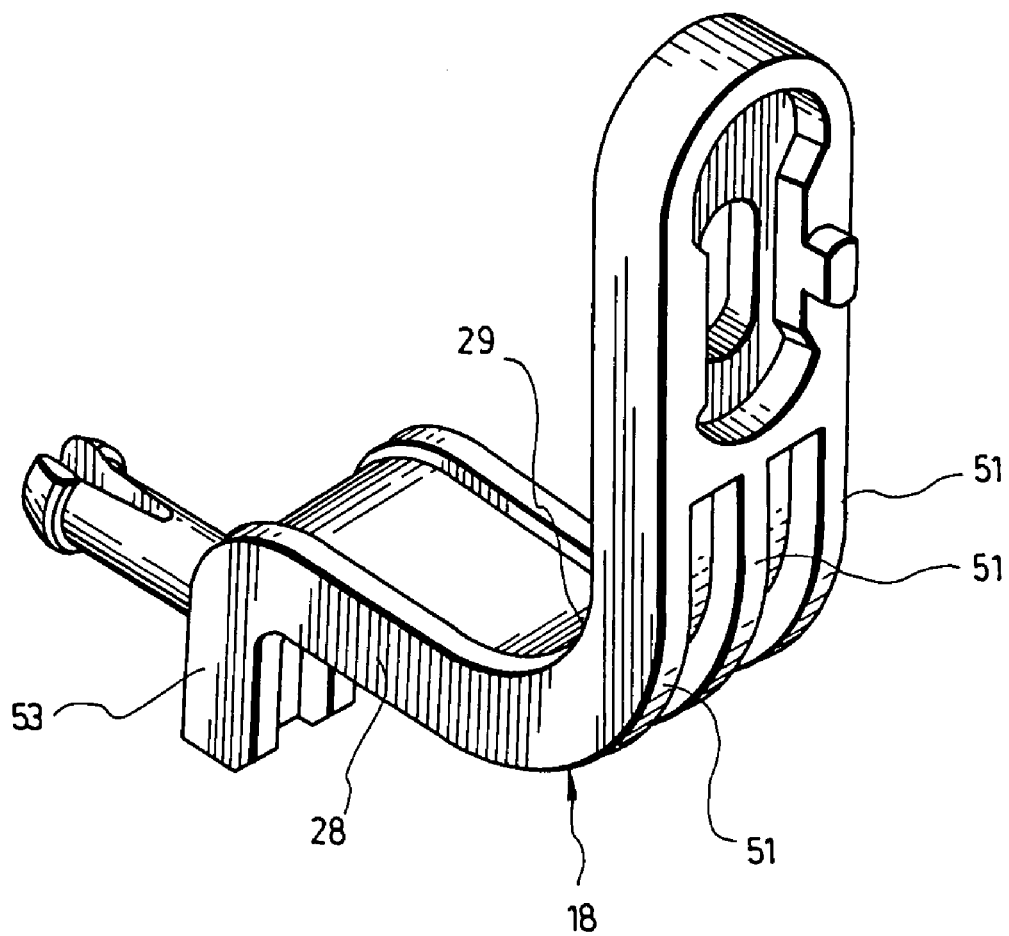
FIG. 11 is a rear view thereof.
Figure 12:
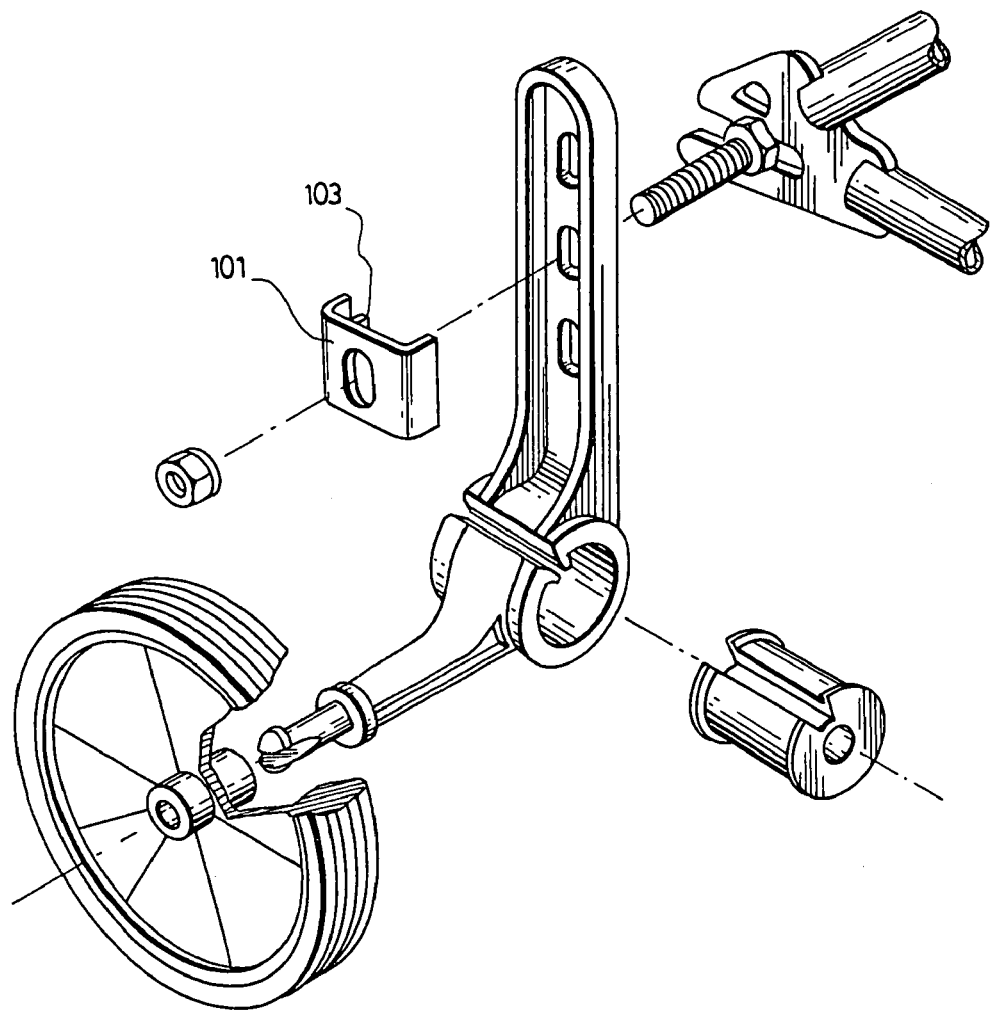
FIG. 12 is an exploded view of the attachment member showing a clip for fastening the attachment member to the bicycle.
Figure 13:
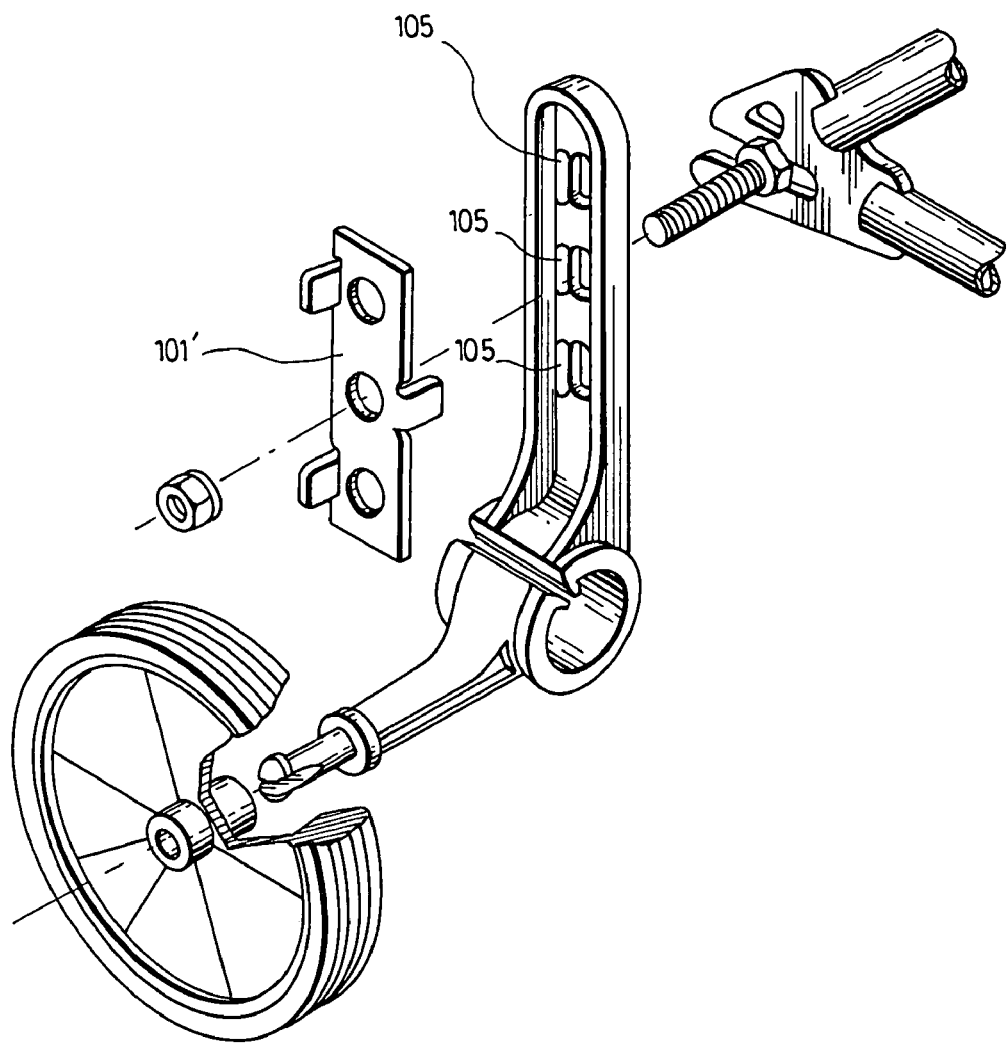
FIG. 13 shows a different clip.

In use, the setting of the height of attachment member 18 relative to rear wheel 14 can either raise rear wheel 14 slightly above ground level, as shown in FIG. 1, while there is no rider loading bicycle 10, or result in having both rear wheel 14 and side wheels 16 in contact with ground G at all times even without rider loading, as shown in FIGS. 8 and 9, depending on user preference. In either case, side wheels 16 will be, under most circumstances, in contact with ground G at all times. When a rider mounts bicycle 10, C-shape compliant structure 27 will yield allowing rear wheel 14 to come in contact with ground G in cases where rear wheel 14 is slightly raised above ground level when bicycle 10 is unloaded. Consequently, this application of force to the C-shape compliant structure 27 will bring vertical portion 20 and spindle portion 28 slightly toward one another to confer a proper amount of downward pressure on wheels 16 for constant contact of the latter with ground G while rear wheel 14 also remains in contact with ground G for propulsion of bicycle 10. If ground level G is uneven, side wheels 16 may move upwards and return downwards to compensate for ground unevenness.

The attachment member 18 could be made of a resilient sturdy semi-rigid plastic material or any other suitable resilient material.

Such an auxiliary wheel assembly will increase the safety margin of the bicycle rider, who will therefore feel more confident in his riding ability and should learn faster how to operate and handle the bicycle in order to eventually use the latter without the auxiliary wheels. Indeed, the attachment member 18, responsively to terrain conditions, automatically performs continuous height adjustments of the auxiliary wheel 16. Such continuous height adjustments are advantageous, both for safety reasons and for educational goals, as they progressively induce in the lay rider the feel of lateral instability of the bicycle at low speeds, while maintaining operating safety margins at comfortable levels.

Although the present invention has been explained hereinabove by way of a preferred embodiment thereof, it should be pointed out that any modifications to this preferred embodiment within the scope of the appended claims is not deemed to alter or change the nature and scope of the present invention. For example, the present description has been made with reference to using the attachment member 18 with a bicycle, but the attachment member 18 can be used with other structures where stabilization is required, either temporarily, or permanently.

What is claimed is:

1. In combination with a bicycle, a single-piece attachment member to be fitted to a rear wheel axle and a tine holding said rear wheel of said bicycle for providing lateral dynamic stability of said bicycle, a pair of such single-piece attachment members adapted to be used concurrently on opposite respective lateral sides of said rear wheel axle, each said single-piece attachment member comprising:

an upper vertical portion including at least one projection and at least one through-hole for insertion on said rear wheel axle, and a lower substantially horizontal spindle portion connected to said vertical portion through a C-shaped compliant structure for allowing said spindle portion to move vertically when subjected to force, said spindle portion being substantially parallel to said rear wheel axle, said C-shaped compliant structure having a central axis parallel to the direction of motion of the bicycle and an opening located between said vertical portion and said spindle portion, said portions acting as substantially perpendicular segments and said C-shaped compliant structure acting as a vertex.

2. The attachment member in combination with said bicycle as claimed in claim 1, further comprising an anchoring component to anchor said attachment member transversely to said rear wheel axle by sandwiching said vertical portion between said anchoring component and said tine of said bicycle holding said rear wheel.

3. The attachment member in combination with said bicycle as claimed in claim 2, further comprising a mounting component for an auxiliary wheel at the end of said spindle portion, said mounting component including a resilient element at the end of said spindle portion where the central opening of the wheel is placed over and said wheel is pushed therethrough, whereby said resilient element is deformed sufficiently to allow passage of said wheel, and, after the wheel is in position, said resilient element returns to its original position, and retains said wheel in place on said spindle portion.

4. The attachment member in combination with said bicycle as claimed in claim 3, wherein said attachment member is made of a single piece of formed resilient material.

5. The attachment member in combination with said bicycle as claimed in claim 2, wherein said vertical portion surrounding said through-hole narrows to closely follow the contour shape of a retention nut located on said rear wheel axle with said retention nut placed between said tine and said attachment member once said attachment member is installed.

6. The combination of claim 5, wherein said upper vertical portion further includes at least one projection adapted to be inserted in a slot of said tine.

7. A single-piece attachment member to be connected to a structure for providing integral static or dynamic suspension to said structure, said single-piece attachment member comprising:

an upper vertical portion including at least one connecting portion configured to attach said attachment member to said structure, and a lower substantially horizontal portion connected to said vertical portion through a C-shaped compliant structure for allowing said horizontal portion to move vertically when subjected to force, said C-shaped compliant structure having a central axis perpendicular to the plane including the vertical portion and horizontal portion, and an opening located between said vertical portion and said horizontal portion, said portions acting as substantially perpendicular segments and said C-shaped compliant structure acting as a vertex.

8. The single piece attachment member according to claim 7, wherein said structure is a bicycle.

9. The single piece attachment member according to claim 7, further comprising an anchoring component for anchoring said upper vertical portion to said structure.

10. The single piece attachment member according to claim 7, wherein said connecting portion includes at least one through-hole for insertion on a protrusion of said structure.

11. The single piece attachment member according to claim 10, wherein said horizontal portion is substantially parallel to said protrusion.

12. A single-piece attachment member for a bicycle comprising:

an upper vertical portion configured to connect to said bicycle;

a lower substantially horizontal portion connected to said vertical portion and generally perpendicular thereto; and a C-shaped compliant structure joining and integrally formed with said upper and lower portions and acting as a vertex, said C-shaped compliant structure configured to allow said horizontal portion to move vertically when subjected to force.

13. The single piece attachment member according to claim 12, wherein said C-shaped compliant structure has a central axis perpendicular to a plane that includes the vertical portion and the horizontal portion, and an opening located between said portions.

14. The single piece attachment member according to claim 13, wherein said opening faces generally upwardly.

15. The single piece attachment member according to claim 12, wherein said C-shaped compliant structure has a central axis parallel to a direction of motion of the bicycle, and an opening located between said horizontal and vertical portions.

16. The single piece attachment member according to claim 15, wherein said opening faces generally upwardly.

17. The single piece attachment member according to claim 12, wherein said horizontal portion is substantially parallel to a rear wheel axle of said bicycle.

* * * * *